United States Patent [19]

Wolter et al.

[11] Patent Number: 4,634,583

[45] Date of Patent: Jan. 6, 1987

[54] METHOD FOR THE DESULFURIZATION OF FLUE GAS OF A FIRING SYSTEM

[75] Inventors: Albrecht Wolter, Cologne; Horst Herchenbach, Hennef, both of Fed. Rep. of Germany

[73] Assignee: Klöckner-Humboldt-Deutz AG, Fed. Rep. of Germany

[21] Appl. No.: 689,393

[22] Filed: Jan. 7, 1985

[30] Foreign Application Priority Data

Jan. 7, 1984 [DE] Fed. Rep. of Germany ....... 3400417
Apr. 21, 1984 [DE] Fed. Rep. of Germany ....... 3415210

[51] Int. Cl.$^4$ .......................... B01J 8/00; C01B 17/00; C04B 7/02
[52] U.S. Cl. .................................... 423/244; 106/100; 106/103
[58] Field of Search .......... 423/244 D, 244 R, 242 R, 423/242 A; 106/103, 100

[56] References Cited

U.S. PATENT DOCUMENTS

| | | | |
|---|---|---|---|
| 3,887,388 | 6/1975 | Christiansen | 106/100 |
| 4,080,219 | 3/1978 | Pennell | 106/103 |
| 4,236,932 | 12/1980 | Herchenbach | 106/100 |
| 4,276,272 | 6/1981 | Schlager et al. | 423/244 |
| 4,298,340 | 11/1981 | Herchenbach et al. | 432/58 |
| 4,421,563 | 12/1983 | Cosar | 106/100 |
| 4,469,664 | 9/1984 | Abelitis et al. | 423/244 |

FOREIGN PATENT DOCUMENTS 2815161 10/1979 Fed. Rep. of Germany .

*Primary Examiner*—Gregory A. Heller
*Attorney, Agent, or Firm*—Hill, Van Santen, Steadman & Simpson

[57] ABSTRACT

A method for the desulfurization of a calcium containing flue gas stream from a firing system such as a cement making plant wherein at least partially deacidified, hot raw cement meal is added to the flue gas at selected points to absorb the sulfur oxides to the calcium present in the gas. The preferred form of the invention comprises suspending the deacidified raw cement meal in the flue gas in the form of a cloud of airborne dust, and thereafter separating the dust from the flue gas after the sulfur oxides have been bonded to the calcium.

8 Claims, 3 Drawing Figures

METHOD FOR THE DESULFURIZATION OF FLUE GAS OF A FIRING SYSTEM

BACKGROUND OF THE INVENTION

1. Field of the Invention

The present invention is in the field of desulfurizing a flue gas from a firing system by means of bonding the gaseous sulfur oxides to calcium.

2. Description of the Prior Art

As a result of legal provisions of Germany and other countries, and particularly due to the "Technical Directive for Maintaining the Purity of Air" operators of large scale industrial firing systems such as, for example, power plants or cement making plants are obliged not to exceed certain limiting values of particulate or gaseous pollutants (for example, dust, carbon monoxide, sulfur dioxide, nitrogen oxides) in the exhaust gases emitted to the atmosphere.

It is therefore necessary to operate exhaust gas cleaning systems, particularly for de-dusting and desulfurization of the exhaust gas. Since large scale industrial firing systems usually produce extremely large quantities of flue gas with relatively low concentrations of pollutants, correspondingly large exhaust gas cleaning systems are required. These involve high investment cost, subsequently high capital cost, high operating cost, maintenance cost, and waste disposal cost. These costs must be added to the product produced. Therefore, it becomes necessary economically as well as competitively to reduce the pollutants not only for economic reasons but for safety reasons. It becomes necessary to employ optimal means which are expanded, or relatively available and to carry out such measures to yield the greatest improvement in exhaust gas cleaning technology, and thus, improvements in the affected environment.

SUMMARY OF THE INVENTION

The present invention provides a method for flue gas desulfurization of industrial firing systems such as, for example, boiler firings or burning systems for cement by means of which an optimum and thereby cost efficient desulfurization of the flue gases is achieved.

In general, this object is achieved by employing at least partially de-acidified raw cement meal in the flue gas as an absorption agent.

In cement burning systems, for example, there is produced a partially de-acidified hot cement meal which is extremely well suited as an absorption agent for gaseous sulfur oxides and is very advantageously available in sufficient quantity and at a cost adding a favorable cost as an intermediate product.

The partially de-acidified meal has an optimum degree of reactivity for the conversion of sulfur oxides with calcium oxide to form calcium sulfate. No additional adsorption agents, for example, activated carbon, pure calcium oxide, milk of lime, or the like need be added for sulfur adsorption. The only thing required is to convey the raw cement meal having an adequately high proportion free calcium oxide to the conduit of the exhaust gas to be desulfurized.

In one form of the invention, the de-acidified raw cement meal is suspended in the flue gas stream in the form of a cloud of airborne dust and is separated from the flue gas stream after adsorption or bonding of the sulfur oxides. The conversion of sulfur oxide with hot meal containing calcium oxide to form calcium sulfate is thereby advantageously achieved within extremely high conversion efficiency.

In the preferred form of the present invention, the degree of de-acidification of the raw cement meal amounts to at least 50% when it is treated with the sulfur oxides. With this degree of de-acidification, a very high affinity of the raw meal for the sulfur oxides of the flue gas is already achieved, and thus the far reaching desulfurization effect is obtained.

In one form of the invention, the hot cement meal is withdrawn from the product conduit for such meal between the last stage of the heat exchanger system and the entrance chamber of the rotary tubular kiln. The de-acidification of the preheated charge material before admission into the burning kiln has progressed the farthest at this location the dislocation in the heat exchanger train, and the raw cement meal or hot cement meal has the highest proportion of free calcium oxide at this point. Further, the withdrawal of a substream of the hot cement meal from the product conduit for hot cement meal can be accomplished in a particularly simple fashion by means of known devices such as those shown, for example, in DE-OS No. 28 15 161.

In a further development of the invention, hot cement meal is withdrawn in the suspension flow of a gas subdischarge from the upper portion of the primary exhaust gas conduit between the last stage of the heat exchanger system and the rotary tubular kiln. At this location, the proportion of thermally activated hot cement meal in the preheater gas stream is especially high so that it suffices to branch a relatively small gas substream of the suspension off, separate the hot raw meal therefrom and supply this to the flue gas conduit for bonding sulfur oxides. The withdrawal of a predetermined amount of hot cement meal from the gas substream thereby turns out to be particularly advantageous and uncomplicated.

In another preferred form of the invention, the hot cement meal is withdrawn in the suspension flow of a gas subdischarge from the region of the inlet chamber of the rotary tubular kiln. This has the advantage that they may make use of existing bypass conduits for the partial extraction of rotary tubular kiln exhaust gases which have been used for the prevention of alkali circulations. Thus, already existing subgas extraction conduits, can serve for the constant extraction of burning kiln exhaust gases that are enriched with evaporated alkalis and can also be utilized for the purpose of withdrawing activated hot cement meal for the desulfurization of the flue gas.

In a further form of the invention, the withdrawn hot cement meal is at least partially quenched with water. As a result, the withdrawn hot exhaust gas of the kiln is very advantageously cooled to a desired temperature, for instance, corresponding to the temperature prevailing in the flue gas conduit as a carrier for the hot cement meal and, on the other hand, a part of the free calcium oxide is converted into calcium hydroxide which likewise functions very advantageously as an adsorption agent.

In another form of the invention, the withdrawn hot cement meal is supplied to the flue gas stream together with excess water. The excess water in the flue gas stream very advantageusly achieves a conditioning of the exhaust gas such that a nearly complete elimination of the pollutants is well as the reacted adsorption agents from the exhaust gas stream can be accomplished with a very low energy outlay in the filter unit, such as an electrostatic filter.

In a further modified form of the invention, the withdrawn raw cement meal or hot cement meal can be supplied to the flue gas stream directly upstream of a grinding-drying system for the raw material which precedes the heat exchanger system. As a result, an intimate mixing of the activated hot cement meal with the flue gas stream containing the sulfur dioxide is guaranteed within the grinding system and a higher efficiency in the conversion of sulfur oxides with calcium oxides to form calcium sulfate is achieved.

In another form of the invention, the withdrawn hot cement meal is supplied to the flue gas stream of stream of a flue gas cleaning or scrubbing apparatus. It has been proven beneficial to work with a certain excess of active adsorotion agents, so that a thin active layer of adsorption agent which is still reactable precipitates on the inside surface of the filter, so that further, residual sulfur dioxide constituents are removed from the exhaust gas.

The reacted hot cement meal is separated from the filter and since it contains a high proportion of calcium sulfate is suitable, for example, as an additive in cement meal as a curing retardant in the cement grinding stock or for employment in the production of plaster or other types of bonding agents such as stucco. It can also be at least partially added to the raw material of a cement burning system.

The invention opens up the advantageous possibility of supplying hot cement meal as an adsorption agent for flue gas desulfurization to large-scale firing systems such, for example, as power plants or other firing systems that are geographically adjacent to or nearby a cement burning system and to employ the same for desulfurization of the exhaust gas of the firing system.

BRIEF DESCRIPTION OF THE DRAWINGS

A further description of the present invention will be made in conjunction with the attached sheets of drawings in which.

DESCRIPTION OF THE PREFERRED EMBODIMENTS

Figure 1:
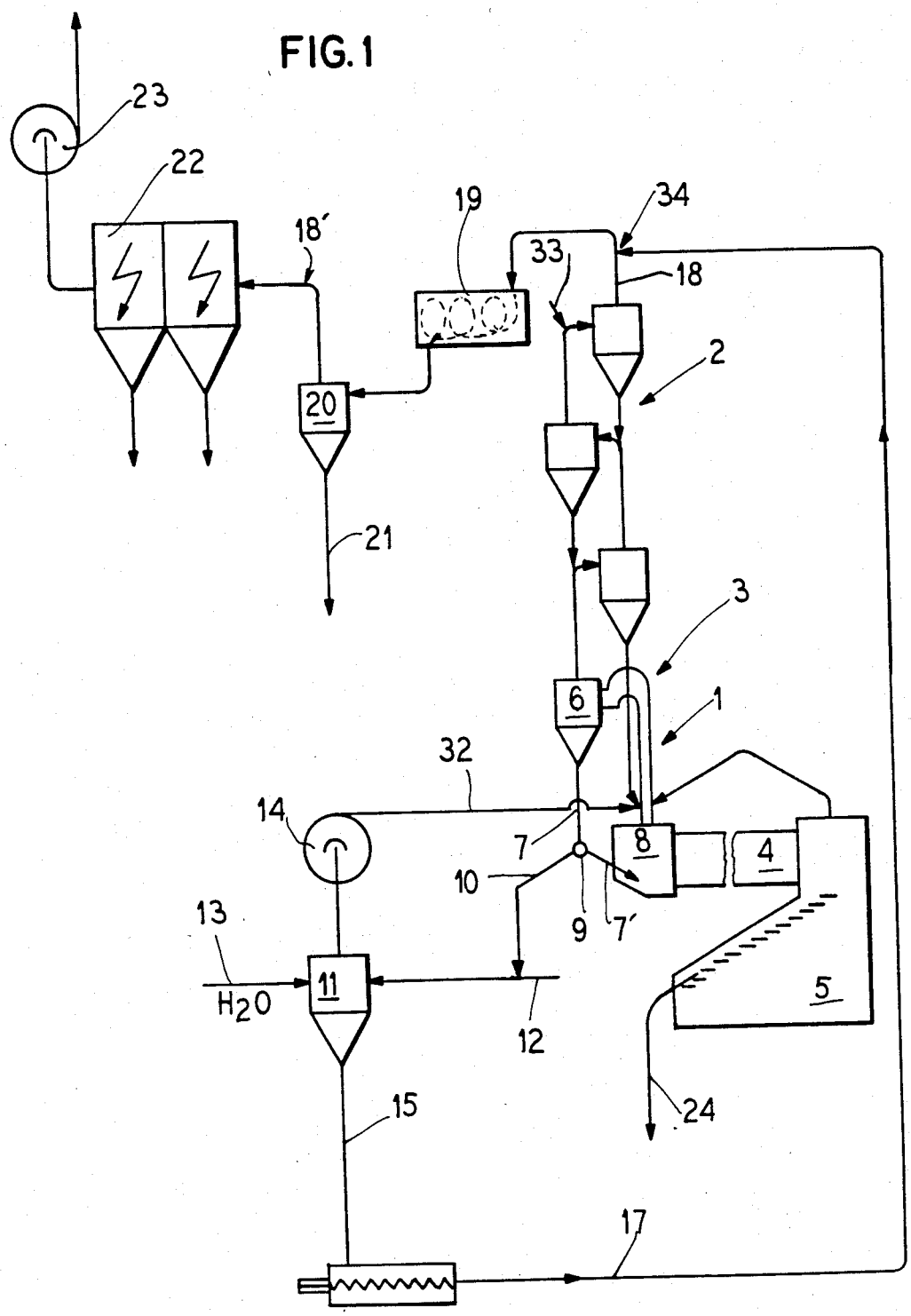
FIG. 1 is a schematic illustration of one method which can be used in accordance with the present invention.

The various embodiments shown in the drawings comprise a rotary tubular kiln and heat exchanger system 1 which comprises a preheating stage 2 and a calcining stage 3 combined with a rotary tubular kiln 4 and a cooler 5 in the usual way. The exhaust gas from the rotary tubular kiln and heat exchanger system 1 is withdrawn from the preheating stage 2 by means of an exhaust gas conduit 18 through a blower 23 and is emitted into the air by means of a chimney (not shown).

In accordance with the method of the present invention, calcined raw meal is taken from the calcining stage 3 as an adsorption agent with the use of a materials divider 9 connected to a separator 6 of the calcining stage 3. The materials divider 9 is disposed, for example, in the conduits 7. The major part of the calcined raw meal is conducted for quicker production into the inlet chamber 8 of the rotary tubular kiln 4 by means of the conduit 7 via the materials divider 9 and conduit 7'. The part of the calcined raw meal required for flue gas desulfurization is withdrawn by means of a branch conduit 10 shown in FIG. 1 into a meal cooler 11. The partially de-acidified raw meal at a temperature of about 850°-900° C. is then cooled by means of fresh air introduced through a conduit 12 and, under some conditions, by means of water injection through an inlet conduit 13. The meal is cooled to a process temperature of about 220°-250° C. Heated cooling air is returned into the system of the rotary tubular kiln and heat exchanger system by means of an exhaust fan 14 to be used, for example, as combustion air by passing through the conduit 32 and is supplied to the preheating stage 2 or to the calcining stage 3. Cooled, calcined raw meal proceeds from the meal cooler 11 through a conduit 15 into a conveyor means 16 and is suspended in the flue gas of the exhaust gas conduit 18 in the form of a cloud of airborne dust with the conduit 17 where it is injected at location 34 and proceeds into a reaction and mixing chamber 19. In the chamber 19, there is an intimate mixing and reaction between sulfur and the flue gas and the reactive calcined the raw meal. The suspension is separated into solids and exhaust gas in a separator 20. The exhaust gas proceeds through a conduit 18' into the de-dusting means 22 and then through the blower 23.

Figure 2:
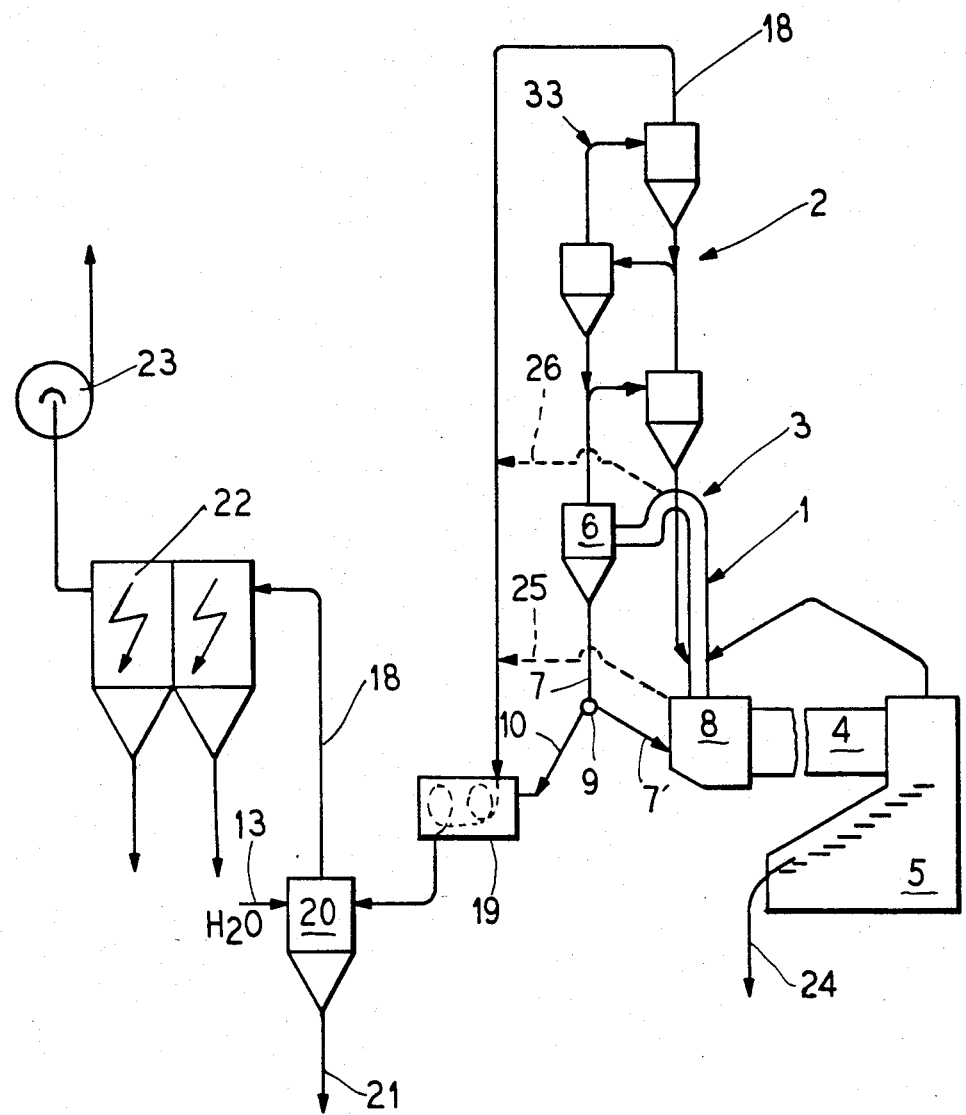
FIG. 2 is a schematic illustration of a modified form of the invention.

In the embodiment shown in FIG. 2, the same reference numerals have been used to identify comparable elements as in FIG. 1. In the form shown in FIG. 2, calcined raw meal at a calcining temperature of about 850° C. is likewise branched off from the main flow by means of a material divider 9 and a branch conduit 10 and is immediately introduced into a mixing chamber 19 into which the exhaust gas conduit 18 also discharges. An intimate mixture in the form of a suspension of calcined raw meal and flue gases is produced therein. An optimum degree of reactivity of the raw meal heated to about 850° C. is thereby obtained. After adsorption of sulfur constituents from the flue gas, the adsorption agent is separated from the flue gas in the separating stage 20 and is eliminated from the system by means of a conduit 21. A water injection inlet 13 is provided for cooling and conditioning the scrubbed exhaust gas. As shown in FIG. 2, a partial withdrawal of suspension can occur almost immediately from the calcining zone 3 through the branch conduit 26 whereby a mixing with flue gas and parts of de-acidified raw meal contained in the partial gas withdrawal conduit 26 causes sulfur constituents to be bonded in the flue gas. A partial gas withdrawal from the inlet chamber 8 of the rotary tubular kiln can also be provided by means of a branch conduit 25. The hot meal thus obtained is at least partially quenched with water by means of an injection line 13 and the temperature of the suspension is lowered at the same time.

Figure 3:
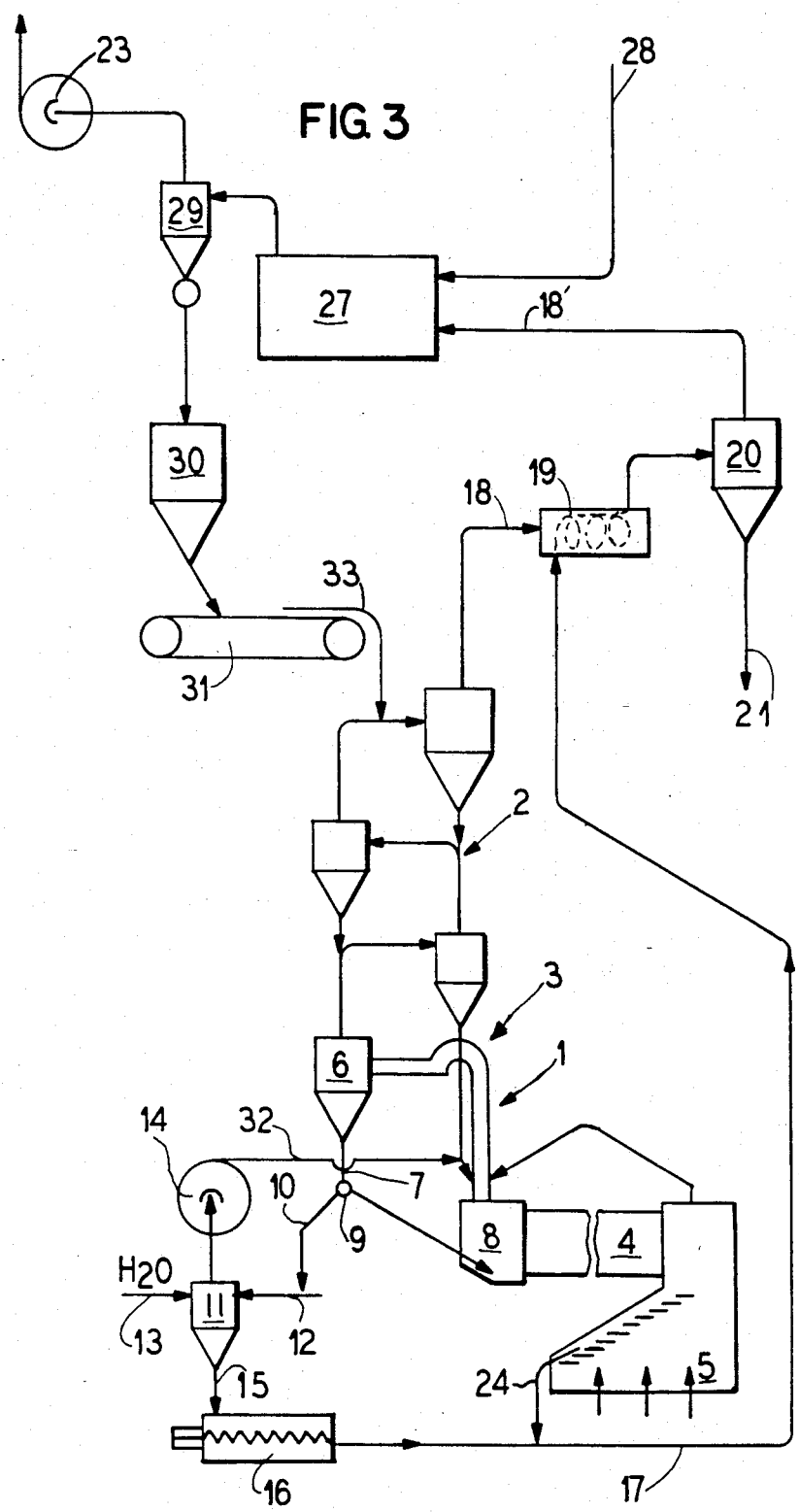
FIG. 3 is a schematic illustration of a still further modified form of the present invention.

In the embodiment shown in FIG. 3, withdrawn hot meal in a line 15 proceeds by means of a conveyor 16 and a conduit 17 into a mixing chamber 19 and is intimately mixed therein with flue gas in the conduit 28. After reaction or adsorption of pollutants in the flue gas, it is eliminated from the system in the separator 20 by means of a conduit 21. The grinder-dryer system 27 is supplied with coarse material in a damp condition through an inlet 28 and is dried in the known fashion by means of hot flue gases entering through an inlet line 18' during its comminution. Finished product is separated out of the gas stream with a separator 29 and is supplied to a finished product hopper 31. A metering discharge means provides a controlled quantity into a conduit 33 feeding the preheating stage 2 of the rotary tubular kiln and heat exchanger system 1.

It should be evident that various modifications can be made to the described embodiments without departing from the scope of the present invention.

We claim as our invention:

1. A method for the desulfurization of a flue gas in a cement making plant employing a tubular kiln-heat exchanger system for the manufacture of cement, said tubular kiln having a calcination stage therein, the method comprising:

introducing raw cement meal into said calcination stage, withdrawing cement meal from said calcination stage at a temperature of about 850° C. to 950° C. and with a deacification degree of at least 50%, cooling the withdrawn hot meal to a temperature of about 220° to 250° C., and thereafter contacting the meal with flue gas present in said kiln-heat exchanger system to bond the sulfur oxides in said flue gas to said partially deacidified meal.

2. A method according to claim 1 which comprises:

withdrawing said meal in suspension from a rotary tubular kiln-heat exchanger system as a partial stream in suspension, and separating the meal from the suspension after the sulfur oxides have reacted with the calcium present in said stream.

3. A method according to claim 2 wherein:

said partial stream is withdrawn at the inlet end of said rotary tubular kiln.

4. A method according to claim 1, wherein:

the hot meal is at least partially cuenched with water.

5. A method according to claim 1, wherein said hot meal is introduced into said flue gas together with water.

6. A method according to claim 1, wherein said hot meal is supplied to said flue gas directly upstream of a grinding-drying system which directly precedes a heat exchanger in a cement manufacturing plant.

7. A method according to claim 1 wherein said hot meal is supplied to said flue gas stream upstream of a flue gas cleansing apparatus.

8. A method according to claim 1 which includes the steps of:

suspending the deacidified meal in said flue gas in the form of a cloud of airborne dust, and thereafter separating the dust from said flue gas after the sulfur oxides have been bonded to said meal.

* * * * *